(12) United States Patent
Carter

(10) Patent No.: US 12,014,314 B2
(45) Date of Patent: Jun. 18, 2024

(54) SYSTEMS AND METHODS FOR SHIPPING PERISHABLE GOODS

(71) Applicant: Mark Lee Carter, Heber City, UT (US)

(72) Inventor: Mark Lee Carter, Heber City, UT (US)

( * ) Notice: Subject to any disclaimer, the term of this patent is extended or adjusted under 35 U.S.C. 154(b) by 0 days.

(21) Appl. No.: 17/376,299

(22) Filed: Jul. 15, 2021

(65) Prior Publication Data
US 2023/0020969 A1    Jan. 19, 2023

(51) Int. Cl.
| | | |
|---|---|---|
| *G06Q 10/0832* | (2023.01) | |
| *G01W 1/02* | (2006.01) | |
| *G01W 1/10* | (2006.01) | |
| *G06Q 10/0833* | (2023.01) | |

(52) U.S. Cl.
CPC .......... *G06Q 10/0832* (2013.01); *G01W 1/02* (2013.01); *G01W 1/10* (2013.01); *G06Q 10/0833* (2013.01)

(58) Field of Classification Search
CPC . G06Q 10/0832; G06Q 10/0833; G01W 1/02; G01W 1/10
See application file for complete search history.

(56) References Cited

U.S. PATENT DOCUMENTS

| | | | | |
|---|---|---|---|---|
| 2003/0234255 A1* | 12/2003 | Hagopian | .......... | B65D 81/3823 220/62.2 |
| 2004/0081729 A1* | 4/2004 | Garwood | ............. | B65B 31/028 426/235 |
| 2019/0301794 A1* | 10/2019 | Esser | .................... | B65D 55/02 |
| 2019/0318309 A1* | 10/2019 | Vaideeswaran | ............................. | G06Q 10/08345 |
| 2021/0300664 A1* | 9/2021 | Fosnight | ................. | F25D 25/04 |
| 2021/0333114 A1* | 10/2021 | Roggenkamp | ..... | G01C 21/3682 |
| 2021/0347124 A1* | 11/2021 | Trim | ....................... | G01W 1/14 |
| 2022/0012680 A1* | 1/2022 | Sion | ................ | G06Q 10/06315 |
| 2022/0051765 A1* | 2/2022 | Wang | ...................... | G01W 1/10 |

OTHER PUBLICATIONS

Jenneke K Heising, Monitoring the Quality of Perishable Foods: Opportunities for Intelligent Packaging, 2013, 645-646 (Year: 2013).*

* cited by examiner

*Primary Examiner* — Ibrahim N El-Bathy
(74) *Attorney, Agent, or Firm* — Jeffrey K. Riddle; Riddle IP, PLLC

(57) ABSTRACT

An information handling system may include a processor; a memory; a power management unit; a network interface device, executed by the processor, to: initiate a communication link with a shipping fulfillment system to request and receive shipping fulfillment data descriptive of shipping requests for one or more packages to contain perishable goods to be shipped; and initiate a communication link with a weather forecast source to request and receive weather data descriptive of weather characteristics associated with a location the one or more perishable goods are to be shipped; and a package customization system executable by the processor to, based on the shipping fulfillment data and the weather data at a location where the perishable goods are to be shipped to, provide customization data describing how to customize a package to ship the perishable goods.

15 Claims, 5 Drawing Sheets

SYSTEMS AND METHODS FOR SHIPPING PERISHABLE GOODS

FIELD OF THE DISCLOSURE

The present disclosure generally relates to shipping of perishable goods. The present disclosure more specifically relates to processing and developing packaging used to ship perishable goods.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a network interface device used to receive real-time data via a network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
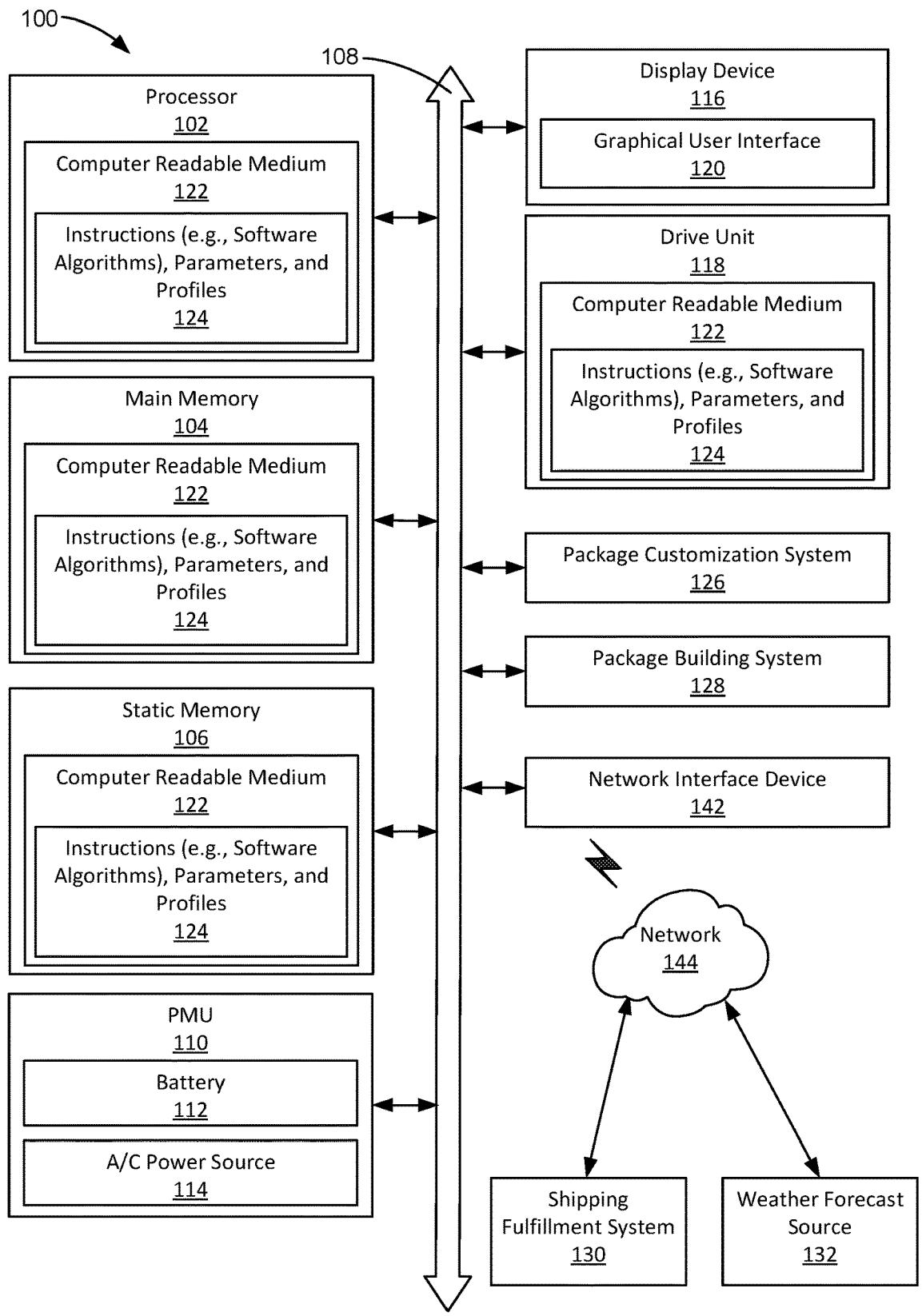
FIG. 1 is a block diagram illustrating an information handling system for managing shipments of perishable goods according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As more and more people are engaging in e-commerce, more and more different types of goods are shipped across country and throughout the world. Among these types of goods are perishable goods that, if left unattended for extended periods of times could destroy the goods being shipped. Such goods include food items such as fresh meats, vegetables, and fruits, flowers, candies such as chocolate, cheese, medications, frozen foods, and other perishable goods shipped today. In order to protect these types of perishable goods from being destroyed due to contact with the elements such as extreme heat and cold, a package may include one or more temperature control devices. This allows the shipper to be more assured that the delivered perishable goods are received by the consumer in a condition acceptable for consumption, and meeting possible FDA Good Manufacturing Practices (known as GMP's). However, what the shipper cannot predict is specific weather conditions at the location where the perishable goods are to be shipped. Additionally, the shipper of the perishable goods is not aware of the weather conditions during transit of the packages containing the perishable goods. Although the inclusion of the temperature control devices in the package may reduce the chances that the perishable goods perish before consumption by the consumer, there are still instances where perishable goods are lost due to unexpected or unchecked weather conditions at the location of delivery or while in transit.

Embodiments of the present disclosure provide for a system and method of sending perishable goods to a location based on shipping fulfillment data and weather data descriptive of weather characteristics associated with, in an embodiment, a location the perishable goods are to be shipped. According to an embodiment, a shipping fulfilment service may execute a network interface device on an information handling system to receive the shipping fulfillment data and the weather data from one or more sources in order to determine how to customize a package used to ship the perishable goods. In an embodiment, the system and method may provide customization data describing how to customize a package to ship the perishable goods b including one or more temperature control devices. These temperature control devices may include devices to maintain, decrease, or increase the temperature within the package over time. In a specific embodiment, the temperature control devices may include a cold pack or a heat pack to decrease or increase the temperature within the package, respectively, or maintain a temperature within the package used to ship the perishable goods. The software and hardware associated with the shipping fulfilment service may also reduce the lack of human intervention required to place cooling agents and product insulation and protection in these boxes for these products. The software application indicates to the order processing person that such packaging and cooling agents are required, thus reducing the inevitable human failure.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may interface with on-demand computer system resources such as those presented in a cloud computing networking system in order to execute the methods descried herein. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses 108 operable to transmit communications between the various hardware components. Portions of an information handling system 100 may themselves be considered information handling systems 100. The information handling system 100 can also include one or more buses 108 operable to transmit communications between the various hardware components such as any combination of various input and output (I/O) devices or the data storage devices described herein.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the package customization system 126 and package building system 128, and a drive unit 118 (volatile (e.g., random-access memory, etc.), nonvolatile (read-only memory, flash memory etc.) or any combination thereof).

The information handling system 100 may further include a power management unit (PMU) 110 (a.k.a. a power supply unit (PSU)). The PMU 110 may manage the power provided to the components of the information handling system 100 such as the processor 102, a cooling system, one or more drive units 118, a graphical processing unit (GPU), the video/graphic display device 116, and other components that may require power when a power button has been actuated by a user. In an embodiment, the PMU 110 may be electrically coupled to the bus 108 to provide this power. The PMU 110 may regulate power from a power source such as a battery 112 or A/C power adapter 114. In an embodiment, the battery 112 may be charged via the A/C power adapter 114 and provide power the to the components of the information handling system 100 when A/C power from the A/C power adapter 114 is removed.

The information handling system 100 may further include a display device 110. The display device 110 in an embodiment may function as a liquid crystal display (LCD), an organic light emitting diode (OLED), a flat panel display, a solid-state display, or a cathode ray tube (CRT). Additionally, the information handling system 100 may include an input device, such as a cursor control device (e.g., mouse, touchpad, or gesture or touch screen input, and a keyboard to allow for interaction with a graphical user interface (GUI) 120 presented on the display device 110.

The GUI 120 may present certain information to a user during the execution of the package customization system 126 and package building system 128 as described herein. In an embodiment, the execution of the package customization system 126 may, via the GUI 120, notify a user that shipping fulfillment data has been received from a shipping fulfillment system 130 that describes a perishable good to be shipped, when the perishable good is to be shipped, the location where the perishable good is to be shipped, temperature ranges that the perishable good is to be shipped at, any stock keeping unit (SKU) number associated with the perishable good, and any temperature control device suggested by a producer of the perishable good to be used to ship with the perishable good, among other shipping fulfillment data. In an embodiment, the execution of the package customization system 126 may, via the GUI 120, notify a user of the receipt of weather data from a weather forecast source 132 associated with the location where the perishable good is to be shipped and/or the any weather data associated with a route that the package is to take to deliver the perishable good. The GUI 120 may also display, during execution of the package customization system 126, any suggested customizations that are to be made to the package so that the perishable good may reach the determined destination based on the shipping fulfillment data and the weather data. In an embodiment, the user may implement the input devices (e.g., mouse, keyboard, etc.) to augment the suggested customizations that are to be made to the package so that the perishable good may reach the determined destination based on the shipping fulfillment data and the weather data.

The network interface device (NID) 142 may provide connectivity to a network 144, e.g., a wide area network (WAN), a local area network (LAN), wireless local area network (WLAN), a wireless personal area network (WPAN), a wireless wide area network (WWAN), or other networks 144. Connectivity may be via wired or wireless connection. The NID 142 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one NID 142 may operate two or more wireless links.

The NID 142 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules, systems, or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer-based functions disclosed herein. For example, instructions 124 may execute a package customization system 126, a package building system 128, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 118 may include a computer-readable medium 122 in which one or more sets of instructions 124 defining the package customization system 126 and/or package building system 128 as software can be embedded. Similarly, main memory 104 and static memory 106 may also contain a computer-readable medium for storage of one or more sets of instructions, parameters, or profiles 124. The disk drive unit 118 and static memory 106 may also contain space for data storage. Further, the instructions 124 may embody one or more of the methods or logic as described herein. For example, instructions relating to the package customization system 126 and package building system 128 with its associated software algorithms, processes, and/or methods may be stored here. In a particular embodiment, the instructions, parameters, and profiles 124 may reside completely, or at least partially, within the main memory 104, the static memory 106, and/or within the disk drive 118 during execution by the processor 102 of information handling system 100. As explained, some or all of the package customization system 126 and package building system 128 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The package customization system 126 and package building system 128 may be stored in static memory 106, or the drive unit 118 on a computer-readable medium 122 such as a flash memory or magnetic disk in an example embodiment. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As mentioned, the information handling system 100 may include a package customization system 126 that may be operably connected to the bus 108. The computer readable medium 122 on which software associated with the package customization system 126 is stored may also contain space for data storage. The package customization system 126 may, according to the present description, perform tasks related to initiating a communication link with a shipping fulfillment system to request and receive shipping fulfillment data descriptive of shipping requests for one or more packages to contain perishable goods to be shipped. In an embodiment, the package customization system 126 may also initiate a communication link with a weather forecast source to request and receive weather data descriptive of weather characteristics associated with a location the one or more perishable goods are to be shipped. In some embodiments, package customization system 126 may access this data in order to, based on the shipping fulfillment data and the weather data, provide customization data describing how to customize a package to ship the perishable goods. In this manner, the package customization system 126 may better customize a package in which the perishable goods are shipped so that the weather at the location of shipping may be considered based on the type of perishable goods being shipped for any given shipment. For example, where the shipping fulfillment data indicates that a set of flowers are to be shipped to Mesa, Arizona from Salt Lake City, Utah, the package customization system 126 may access the weather data in order to find predicted weather conditions during shipment and at arrival of the package in order to provide suggested customizations to the package. Where the temperatures are above a threshold temperature in Mesa, the package customization system 126 may suggest the inclusion of one or more temperature control devices (e.g., cold packs) in the package. In this embodiment, the package customization system 126 may also provide suggestions as to whether and, if so, how much insulation to include in the package along with the suggested included temperature control devices. Similarly, where the temperatures are below a threshold temperature in Mesa, the package customization system 126 may suggest the inclusion of a different type of temperature control device (e.g., a heat pack) or the exclusion of any other temperature control devices (e.g., cold packs). Again, the package customization system 126 may also provide suggestions as to whether and, if so, how much insulation to include in the package along with the suggested included temperature control devices. It is appreciated, therefore, that the execution of the package customization system 126 takes into consideration the location, duration of transit of the package of perishable goods, the weather during transit, the weather at the final shipping location, and the type of perishable goods being shipped.

In an embodiment, the package customization system 126 may be provided with shipping instructions associated with each SKU of each perishable good to be shipped on behalf of a seller of the perishable goods. In this embodiment, the seller may provide the fulfillment company operating the information handling system 100 with a list of thresholds indicative of what levels of temperatures and at what locations (e.g., relative to the origin of shipping) the perishable goods are to be shipped. With this data input and stored in the memory devices (e.g., 122, 104, 106, 118), the package customization system 126 may access this data, compare shipping fulfillment data (e.g., distance from origin of shipping) and weather data obtained from the shipping fulfillment system 130 and weather forecast source 132, respectively, to this list of thresholds indicative of what levels of temperatures and at what locations (e.g., relative to the origin of shipping) the perishable goods are to be shipped obtained from the seller.

In alternative embodiments, the package customization system 126 may execute specific algorithms or computer code that helps the package customization system 126 to calculate how much insulation and what number, if any, temperature control devices to include in the package. These algorithms or computer code may base these calculations on, for example, an effective lifespan of the temperature control devices, the ability of the temperature control devices to maintain a specific temperature or temperatures in the package, the number of temperature control devices used (if any), and the amount of insulation included in the package (if any), among other factors.

In an embodiment, the package customization system 126 may communicate with the main memory 104, the processor 102, the display device 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

As described herein, the information handling system 100 may include a package building system 128. The package building system 128 may be operatively coupled to the package customization system 126 via a bus 108 of the information handling system 100. The package building system 128 may receive directions from the package customization system 126 descriptive of how the package used to ship a specific perishable good in is to be built. In an embodiment, the package building system 128 may receive from the package customization system 126 data describing the amount of insulation (if any) to include in the package, the number (if any) temperature control devices to include in the package, and the dimensions of the package in order to fit the perishable goods, insulation (if any), and temperature control devices (if any). In an embodiment, the package building system 128 may interface with the display device 116 via the bus 108 in order to, for example, display at a GUI 120 package building specifications to a worker at the fulfillment location (e.g., a builder of the package) instructive as to how to build the package used to ship the perishable goods. This allows the worker to know, among other features, the dimensions of the package, the amount of insulation (if any) to include in the package, the number of (if any) temperature control devices to include in the package, and how to arrange the insulation and temperature control devices within the dimensions of the package. In this manner, the package building system 128 may direct anyone as to how the package for any specific package fulfillment request from a seller is to be built.

In an alternative embodiment, the package building system 128 may be operatively coupled to, for example, package assembly information handling system that executes a package assembly GUI directing automated package assembly machinery that automatically builds the package used to ship the perishable goods. The automated package assembly machinery may include any machinery that physically builds the package and may include conveyor belts, gluing devices, stapling devices, insulation insertion devices, temperature control device-insertion devices, taping devices, among others. In a specific embodiment, the automated package assembly machinery may include a mold into which any number of temperature control devices are inserted, closed, and expansion insulation is injected into the mold. In this embodiment, the mold may embed the selected number of temperature control devices into insulative walls that are then placed into a cardboard box thereby forming the package into which the perishable goods are placed. Although specific types of packages are described in the present specification, the description contemplates that other form factors of packages may be automatically built by the automated package assembly machinery.

In an embodiment, the package building system 128 may communicate with the main memory 104, the processor 102, the display device 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In the embodiments herein, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

As descried herein, the information handling system 100 may interface with on-demand computer system resources such as those presented in a cloud computing networking system in order to execute the methods descried herein. In an embodiment, the software used to execute the methods described herein may be maintained at, for example, a server that receives and sends requests to and from a user's computing device. In any scenario, the user's computing device may be associated with a package assembly information handling system physically located remotely from the server and at a package assembly facility operated by the owner.

In this embodiment, the package assembly information handling system may access the data received from the package customization system 126 executed at the server in order to receive those instructions related to how to assemble the package for shipment of the perishable goods. In this embodiment, the server executing the software defining the package customization system 126 may access the shipping fulfillment system 130 and weather forecast source 132 prior to providing the package assembly information handling system with the instructions regarding how to assembly the package for shipment of the perishable goods. Additionally, the package assembly information handling system may be operatively coupled to automated package assembly machinery used to automatically assembly the package for shipment according to an embodiment described herein. With the use of the cloud-computing configuration as described here, the user of the package assembly information handling system may be able to access the data produced by the package customization system 126 at any facility or location remote from the server. Therefore, the user may operate multiple package assembly information handling systems located throughout a region in order to build packages and ship perishable goods from a plurality of locations. The embodiments described herein, therefore, contemplate both those software/firmware/hardware configurations that include native software at the information handling system (e.g., information handling system 100) or software accessible via a server within a cloud-computing environment.

Figure 2:
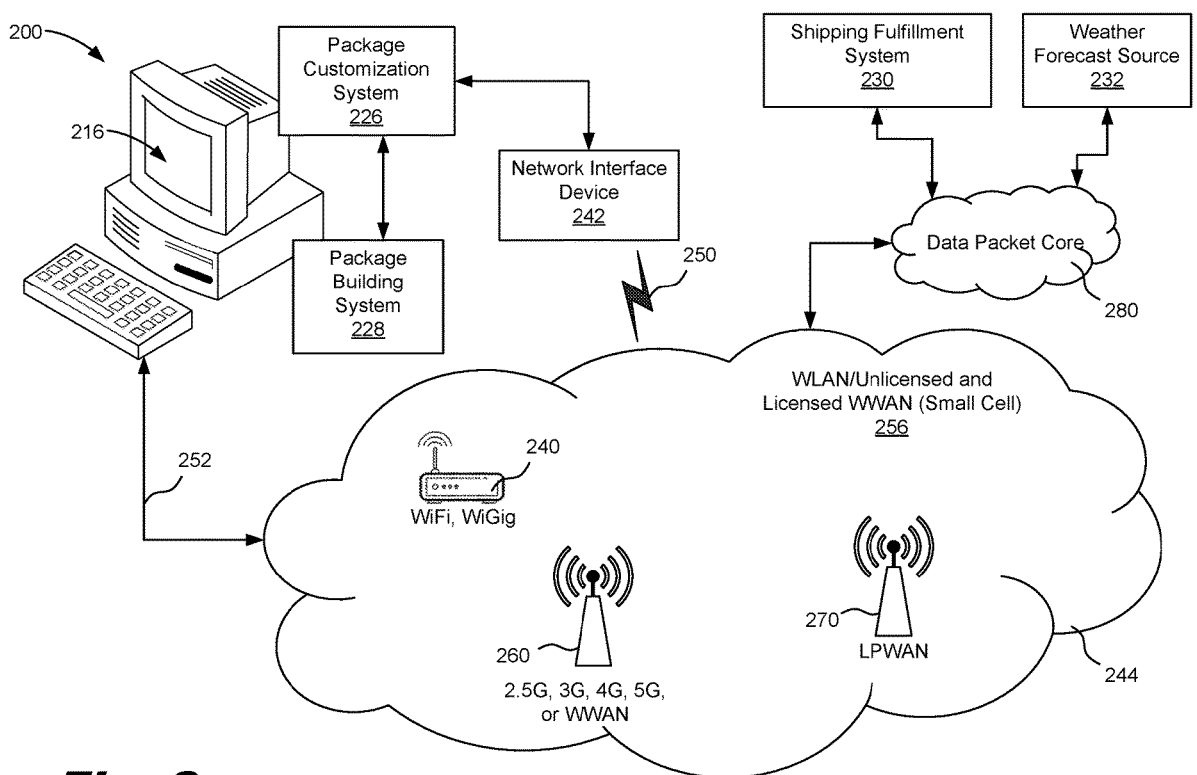
FIG. 2 is a block diagram illustrating an information handling system 200 for managing shipments of perishable goods over a network 244 according to another embodiment of the present disclosure.

FIG. 2 is a block diagram illustrating an information handling system 200 for managing shipments of perishable goods over a network 244 according to another embodiment of the present disclosure. FIG. 2 shows a network 244 that includes several wireless communication protocol options to any type of information handling systems 200 according to an embodiment of the present disclosure. FIG. 2 illustrates a macro-communication network 200 that may include a plurality of individual communication networks that communicatively couples one or more information handling systems 200 such as the information handling system described in connection with FIG. 1 to one of these communication networks.

In a particular embodiment, network 244 includes networked information handling systems 200, 5G wireless access points, and multiple wireless connection link options. A variety of additional computing resources of the network 244 may include client mobile information handling systems, data processing servers, network storage devices, local and wide area networks, or other resources as needed or desired. As partially depicted, the information handling system 200 may be a laptop computer, a desktop computer, a tablet computer, a smart phone device or other computing devices. These information handling systems 200 may access a wireless local network 256, or they may access a macro-cellular network via an access point (AP) as part of the network 244 used to communicatively couple the information handling system 200 to the shipping fulfillment system 230 and/or weather forecast source 232 remote from the information handling system 200. One or more APs 240 may include Wi-Fi-enabled access point, private and public long-term evolution (LTE)-enabled access points, and 5G new radio (NR)-enabled access points (WiGig) and may include a plurality of each to allow for the information handling systems 200 to communicate with the communication networks (e.g., a Wi-Fi communication network, a public LTE communication network, and a private LTE communication network, among others). In an example, a wireless local network 256 may be the wireless local area network (WLAN), a wireless personal area network (WPAN), or a wireless wide area network (WWAN). In an example embodiment, LTE-LAA WWAN may operate with a small-cell WWAN wireless access point option.

Components of a wireless local network 256 may be connected by wireline or Ethernet connections to a wider external network. For example, wireless 5G NR-enabled APs 240 may be connected to a wireless network controller and an Ethernet switch. Wireless communications across wireless local network 256 may be via standard protocols such as IEEE 802.11 Wi-Fi, IEEE 802.11ad WiGig, IEEE 802.15 WPAN, or 5G small cell WWAN communications such as eNodeB, IEEE 802.11, IEEE 1914/1904, IEEE P2413/1471/42010, APs 315, 325, 335 implementing 802.11b, 802.11a, 802.11g, 802.11n, 802.11ac, and 802.11ax IEEE standards, or similar wireless network protocols developed for 5G, LTE, and Wi-Fi communications.

Alternatively, other available wireless links within network 300 may include macro-cellular connections via one or more service providers 260, 270. Service provider 260, 270 macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 256 and macro-cellular networks may include a variety of licensed, unlicensed or shared communication frequency bands as well as a variety of wireless protocol technologies ranging from those operating in macrocells, small cells, picocells, or femtocells.

In some embodiments according to the present disclosure, a networked information handling system 200 may be operatively coupled to any network 244 via a wired connection 252 or a wireless connection 250 formed between the information handling system 200 and an AP 240. The networked information handling system 200 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the wireless communication devices so that a beamforming processes, for example, may be engaged. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within a local portion of the wireless network 244, access points for Wi-Fi or WiGig as well as small cell WWAN connectivity may be available in emerging 5G technology. This may create situations where a plurality of antenna systems is operating on an information handling system 200 via concurrent communication wireless links on both WLAN and WWAN or multiple concurrent wireless links to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a single transceiving antennas capable of receiving and transmitting, and/or more than one transceiving antennas.

The data packet core network 280 may contain externally accessible computing resources and connect to a remote data resources such as the shipping fulfillment system 230 and the weather forecast source 232 described herein. The voice and packet core network 280 may contain multiple intermediate web servers or other locations with accessible data (not shown). The voice and packet core network 280 may also connect to other wireless networks similar to the network 244 and additional information handling systems. The connection to other additional wireless networks may be via Ethernet or another similar connection to the world-wide-web, a WAN, a LAN, or other network structure. Such a connection may be made via an access point/Ethernet switch to the external network and be a backhaul connection. The access point may be connected to one or more wireless access points before connecting directly to an information handling system or may connect directly to one or more mobile information handling systems. Alternatively, the information handling system 200 may connect to the external network via base station locations at service providers 260 and 270. These service provider locations may be network connected via backhaul connectivity through the data packet core network 280.

Remote data centers such as the shipping fulfillment system 230 and the weather forecast source 232 may include web servers or resources within a cloud environment that operate via the data packet core 280 or other wider internet connectivity. For example, remote data centers may include additional information handling systems, data processing servers, network storage devices, local and wide area networks, or other resources as needed or desired. Having such remote capabilities may permit fewer resources to be maintained at the information handling system 200 allowing streamlining and efficiency within that device. In an example where the information handling system 200 includes streaming applications or other high data throughput application, those processing resources at the remote data centers may supplement the high volume of processing used to provide those processes described herein. Similarly, remote data center permits fewer resources to be maintained in other parts of network 244.

During operation, the processor of the information handling system 200 may execute the package customization system 226 in order to initiate a communication link, via the NID 242, with the shipping fulfillment system 230 and request and receive shipping fulfillment data descriptive of shipping requests for one or more packages to contain perishable goods to be shipped. As described herein, the shipping fulfillment data may be provided by one or more sellers of the perishable goods. As such, the seller of the perishable goods may provide secure access to the shipping fulfillment data via, for example, requesting a secure password in order to gain access or provide an encryption key. Because this shipping fulfillment data maintained by the seller of the perishable goods may include personal data such as addresses of customers, banking information, credit card information, dates of birth of the customers, among others, the secure access may prevent unauthorized persons from gaining access to it at the shipping fulfillment system 230 maintained by the seller.

In an embodiment, the shipping fulfillment system (also known in the supply chain and transportation industry as a Warehouse Management System, Order Management System, ERP, or Shopping Cart) 230 may form part of the information handling system 200. In an alternative embodiment, the shipping fulfillment system 230 may be remote from the information handling system 200 but maintained by the owner or operator of the information handling system 200 with the seller of the perishable goods to be shipped updating the shipping fulfillment data thereon upon a request from a purchaser of the perishable goods. In yet another alternative embodiment, the shipping fulfillment system 230 may be maintained, updated, and operated by the seller of the perishable goods who then allows the operator of the information handling system 200 to gain secure access to the shipping fulfillment data upon request. In an embodiment, the package customization system 126, when executed by the processor of the information handling system 200, may signal to the package building system 128 that further shipping fulfillment data is being requested upon which access may be granted when security credentials are provided by the information handling system 200. In these example embodiments, the purchaser of the perishable goods may access a website, for example, associated with the seller of the perishable goods in order to complete an order process. The seller's system that may include its own information handling system may update the shipping fulfillment data maintained at the shipping fulfillment system 230 and, in an embodiment, notify the user/owner of the information handling system 200 in FIG. 2 that new shipping fulfillment data has been made available.

As described herein, the shipping fulfillment data maintained by the shipping fulfillment system 230 may include any information that facilitates the ordering and shipping of the perishable goods. This may include a perishable good to be shipped, when the perishable good is to be shipped, the location where the perishable good is to be shipped, temperature ranges that the perishable good is to be shipped at, any stock keeping unit (SKU) number associated with the perishable good, and any temperature control device suggested by a producer of the perishable good to be used to ship with the perishable good, among other shipping fulfillment data. Additional information may be provided to the information handling system 200 by the shipping fulfillment system 230 that facilitates the information handling system 200 to customize a package via the package customization system 226 and build that customized package via execution of the package building system 228.

When the shipping fulfillment data has been accessed and receive from the shipping fulfillment system 230 by the information handling system 200, the processor of the information handling system 200 may initiate a communication link, via the NID 242, with a weather forecast source 232 to request and receive weather data descriptive of weather characteristics associated with a location the one or more perishable goods are to be shipped. The weather forecast source 232 may, in an embodiment, include weather-related webpages that provide weather forecasts of specific locations. Example weather-related webpages include weather.com operated by The Weather Company®, weatherbug.com operated by GroundTruth®, accuweather.com operated by AccuWeather® Inc., among others. In an embodiment, a single weather-related webpage may be used as the weather forecast source 232 to acquire the weather data. In an embodiment, more than one weather-related webpage may be used as the weather forecast source 232 to acquire the weather data. Additionally, or alternatively, the weather forecast source 232 may include government databases such as the national weather service at weather.gov.

Once the shipping fulfillment data and weather data associated with the shipment of any given perishable good is acquired, the information handling system 200 may then execute the package customization system 226 to provide customization data describing how to customize a package to ship the perishable goods. Again, the customization of the package is based on the shipping fulfillment data and the weather data specific to a package used to ship the perishable goods ordered by a customer from the seller. In the context of the present specification, this process may be conducted for each package to be shipped on behalf of the seller by the operator of the information handling system 200. The package customization system 226 may, therefore, better customize a package in which the perishable goods are shipped so that the weather at the location of shipping may be considered based on the type of perishable goods being shipped for any given shipment. For example, where the shipping fulfillment data obtained from the shipping fulfillment system 230 indicates that freshly caught seafood are to be shipped to New York, New York from Spokane, Washington, the package customization system 226 may access the weather data in order to find predicted weather conditions during shipment and at arrival of the package in order to provide suggested customizations to the package. In an embodiment, only the weather conditions at the shipping location and at the time of arrival of the package is used to customize the package. Where the temperatures are indicated by the weather data to be above a threshold temperature in New York, the package customization system 226 may suggest the inclusion of one or more temperature control devices (e.g., cold packs) in the customized package. In this embodiment, the package customization system 226 may also provide suggestions as to whether and, if so, how much insulation to include in the customized package along with the suggested included temperature control devices. Similarly, where the temperatures are indicated to fall below a threshold temperature per the weather data in New York, the package customization system 226 may suggest the inclusion of a different type of temperature control device (e.g., a heat pack) or the exclusion of any other temperature control devices (e.g., cold packs) at all. Again, the package customization system 226 may also provide suggestions as to whether and, if so, how much insulation to include in the package along with the suggested included temperature control devices. It is appreciated, therefore, that the execution of the package customization system 226 takes into consideration the location, duration of transit of the package of perishable goods, the weather during transit, the weather at the final shipping location at the time of arrival, and the type of perishable goods being shipped. This better customizes the package used to ship the perishable goods thereby increasing the ability of the seller to successfully ship a product that in a form to be consumed by the purchaser. This further reduces customer dissatisfaction and reduces lost revenue due to the perishable goods perishing prior to consumption by the user.

In an embodiment, the package customization system 226 may also be provided special dimensions of the perishable goods to be shipped from the shipping fulfillment system 230. These specific dimensions (e.g., defined or cross-referenceable via the SKU for example) may include height, length, and width dimension data descriptive of the size of the perishable goods. As descried herein, in a specific embodiment, the customized packages may include walls of insulation placed along interior edges of, for example, a cardboard outer layer. These insulation walls may have one or more temperature control devices embedded in them by placing the temperature control devices in a mold, closing the mold, and injecting an expansion insulation foam or other type of insulation material. The insulation walls may form a space or void therein where the perishable goods may be placed. Therefore, in an embodiment, the specific dimensions of the perishable goods may be taken into consideration in order for the package customization system 226 to customize a package used to ship the perishable goods. In this embodiment, the package customization system 226 may build the package from the inside out such that space is conserved in the void within the package, keeping the perishable goods secure within the package itself, while also maintaining a specific temperature in the package and protecting the perishable goods.

In an embodiment, the information handling system 200 includes a package building system 228. As described herein, the package building system 228 may provide a graphical representation of the customized package to be built to fulfill the order of the perishable goods. This graphical representation may be presented on a GUI presented to the user via a display device 216 of the information handling system 200. This GUI, in an embodiment, may provide a builder of the package to understand the amount of insultation to include within the package (if any), the number of temperature control devices to include in the package (if any), the type of temperature control devices to include in the package, and the dimensions of the package being built in order to fit the perishable good inside the package, among other details. In some examples, certain sellers of the perishable goods may request specific additional details be incorporated into the building of the package such as specific types of packing tape to be used, specific types of cardboard to use, specific types of temperature control devices to use, among other details. The package customization system 226 may identify these seller-specific details and cause the package building system 228 to incorporate those details in the building process of the package. In this embodiment, the worker physically building the package may reference the GUI and build the package per the described specifications presented on the GUI, place the perishable goods therein, seal the package, and provide shipping labels on the package to direct a carrier to deliver the package at a specific location at a specific time frame. In an embodiment, the shipping label may describe the shipping service to use such as FedEx®, UPS®, USPS®, DHL®, among others. The shipping label may include a barcode used to facilitate the transfer and delivery of the package to its final destination.

In an embodiment, the package building system 228 may be operatively coupled to automated package assembly machinery that, per the digitally built customized package details, physically builds the package according to those specifications. The automated package assembly machinery may include any machinery that physically builds the package and may include conveyor belts, gluing devices, stapling devices, insulation insertion devices, temperature control device-insertion devices, taping devices, among others. In a specific embodiment, the automated package assembly machinery may include a mold into which any number of temperature control devices are inserted, closed, and expansion insulation is injected into the mold. In this embodiment, the mold may embed the selected number of temperature control devices into insulative walls that are then placed into a cardboard box thereby forming the package into which the perishable goods are placed. Although specific types of packages are described in the present specification, the description contemplates that other form factors of packages may be automatically built by the automated package assembly machinery. In an embodiment, a worker may oversee the operation of the building processes conducted by the automated package assembly machinery and address any issues that may arise due to the automation of this process. By including the automated package assembly machinery in this embodiment, the costs associated with physical labor and slow production may be reduced allowing the owner/operator of the information handling system 200 to accommodate for additional packages that may be built.

Figure 3:
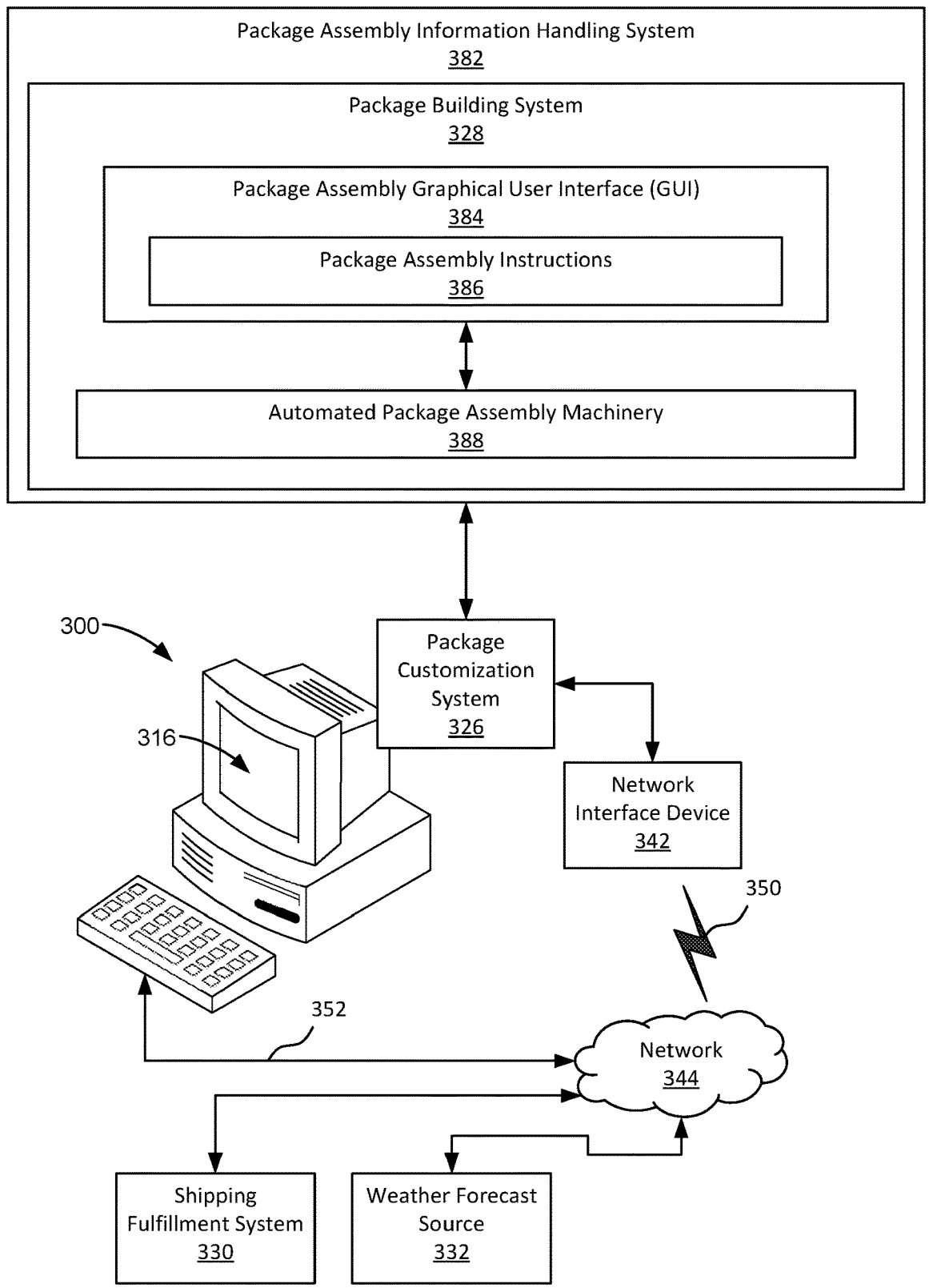
FIG. 3 is a block diagram illustrating an information handling system for managing shipments of perishable goods according to another embodiment of the present disclosure.

FIG. 3 is a block diagram illustrating an information handling system 300 for managing shipments of perishable goods according to another embodiment of the present disclosure. Similar to the information handling systems described in connection with FIGS. 1 and 2, the information handling system 300 may include a package customization system 326. The package customization system 326 may, according to the present description, perform tasks related to initiating a communication link with a shipping fulfillment system 330 to request and receive shipping fulfillment data descriptive of shipping requests for one or more packages to contain perishable goods to be shipped. The shipping requests may arise from the purchase of a perishable good by a purchaser over the internet or by other means. The seller of the perishable goods may maintain this shipping fulfillment data on a shipping fulfillment system as described herein. In an embodiment, the package customization system 326 may also initiate a communication link with a weather forecast source 332 as described herein to request and receive weather data descriptive of weather characteristics associated with a location the one or more perishable goods are to be shipped. In some embodiments, package customization system 326 may access this data in order to, based on the shipping fulfillment data and the weather data, provide customization data describing how to customize a package to ship the perishable goods. In this manner, the package customization system 326 may better customize a package in which the perishable goods are shipped so that the weather at the location of shipping may be considered based on the type of perishable goods being shipped for any given shipment. For example, where the shipping fulfillment data indicates that a box of chocolates are to be shipped to Miami, Florida from Salt Lake City, Utah, the package customization system 326 may access the weather data in order to find predicted weather conditions during shipment and at arrival of the package in order to provide suggested customizations to the package. Where the temperatures are above a threshold temperature in Miami, the package customization system 326 may suggest the inclusion of one or more temperature control devices (e.g., cold packs) in the package. In this embodiment, the package customization system 326 may also provide suggestions as to whether and, if so, how much insulation to include in the package along with the suggested included temperature control devices. Similarly, where the temperatures are below a threshold temperature in Miami, the package customization system 326 may suggest the inclusion of a different type of temperature control device (e.g., a heat pack) or the exclusion of any other temperature control devices (e.g., cold packs). Again, the package customization system 326 may also provide suggestions as to whether and, if so, how much insulation to include in the package along with the suggested included temperature control devices. It is appreciated, therefore, that the execution of the package customization system 326 takes into consideration the location, duration of transit of the package of perishable goods, the weather during transit, the weather at the final shipping location, and the type of perishable goods being shipped.

In an embodiment, the package customization system 326 may be provided with shipping instructions associated with each SKU of each perishable good to be shipped on behalf of a seller of the perishable goods. In this embodiment, the seller may provide the fulfillment company operating the information handling system 300 with a list of thresholds indicative of what levels of temperatures and at what locations (e.g., relative to the origin of shipping) the perishable goods are to be shipped. With this data input and stored in the memory devices, the package customization system 326 may access this data, compare shipping fulfillment data (e.g., distance from origin of shipping) and weather data obtained from the shipping fulfillment system 330 and weather forecast source 332, respectively, to this list of thresholds indicative of what levels of temperatures and at what locations (e.g., relative to the origin of shipping) the perishable goods are to be shipped obtained from the seller.

In alternative embodiments, the package customization system 326 may execute specific algorithms or computer code that helps the package customization system 326 to calculate how much insulation and what number, if any, temperature control devices to include in the package. These algorithms or computer code may base these calculations on, for example, an effective lifespan of the temperature control devices, the ability of the temperature control devices to maintain a specific temperature or temperatures in the package, the number of temperature control devices used (if any), and the amount of insulation included in the package (if any), among other factors.

FIG. 3 further shows additional details related to the operation of the package building system 328. The package building system 328 may be operatively coupled to the package customization system 326 of the information handling system 300 and, in the embodiment shown in FIG. 3, executed by a processor of a package assembly information handling system 382. In an embodiment, the package assembly information handling system 382 and information handling system 300 may be operatively coupled together via a network via a wired or wireless connection. In this embodiment, the information handling system 300 may be managed and operated by an operator of a package building and packing facility while the package assembly information handling system 382 may be operated by a floor worker at a warehouse, for example. In an alternative embodiment, the package building system 328 may be executed by a processor of the information handling system 300 without the operative coupling of a package assembly information handling system 382.

The package building system 328 may receive directions from the package customization system 326 descriptive of how the package used to ship a specific perishable good in is to be built. In an embodiment, the package building system 328 may receive from the package customization system 326 data describing the amount of insulation (if any) to include in the package, the number (if any) temperature control devices to include in the package, and the dimensions of the package in order to fit the perishable goods, insulation (if any), and temperature control devices (if any).

In an embodiment, the package building system 328 may be executed by a processor of a package assembly information handling system 382 that includes a display device in order to, for example, display at a package assembly GUI 384 showing package assembly instructions 386 to a worker at the fulfillment location (e.g., a builder of the package) describing how to build the package used to ship the perishable goods. This allows the worker to know, among other features, the dimensions of the package, the amount of insulation (if any) to include in the package, the number of (if any) temperature control devices to include in the package, and how to arrange the insulation and temperature control devices within the dimensions of the package. In this manner, the package building system 328 may direct the package builder as to how the package for any specific package fulfillment request from a seller is to be built.

In an alternative embodiment, the package building system 328 may be operatively coupled to, for example, automated package assembly machinery 388 that automatically builds the package used to ship the perishable goods. The automated package assembly machinery 388 may include any machinery that physically builds the package and may include conveyor belts, gluing devices, stapling devices, insulation insertion devices, temperature control device-insertion devices, taping devices, among others. In a specific embodiment, the automated package assembly machinery 388 may include a mold into which any number of temperature control devices are inserted, closed, and expansion insulation is injected into the mold. In this embodiment, the mold may embed the selected number of temperature control devices into insulative walls that are then placed into a cardboard box thereby forming the package into which the perishable goods are placed. Although specific types of packages are described in the present specification, the description contemplates that other form factors of packages may be automatically built by the automated package assembly machinery.

Figure 4:
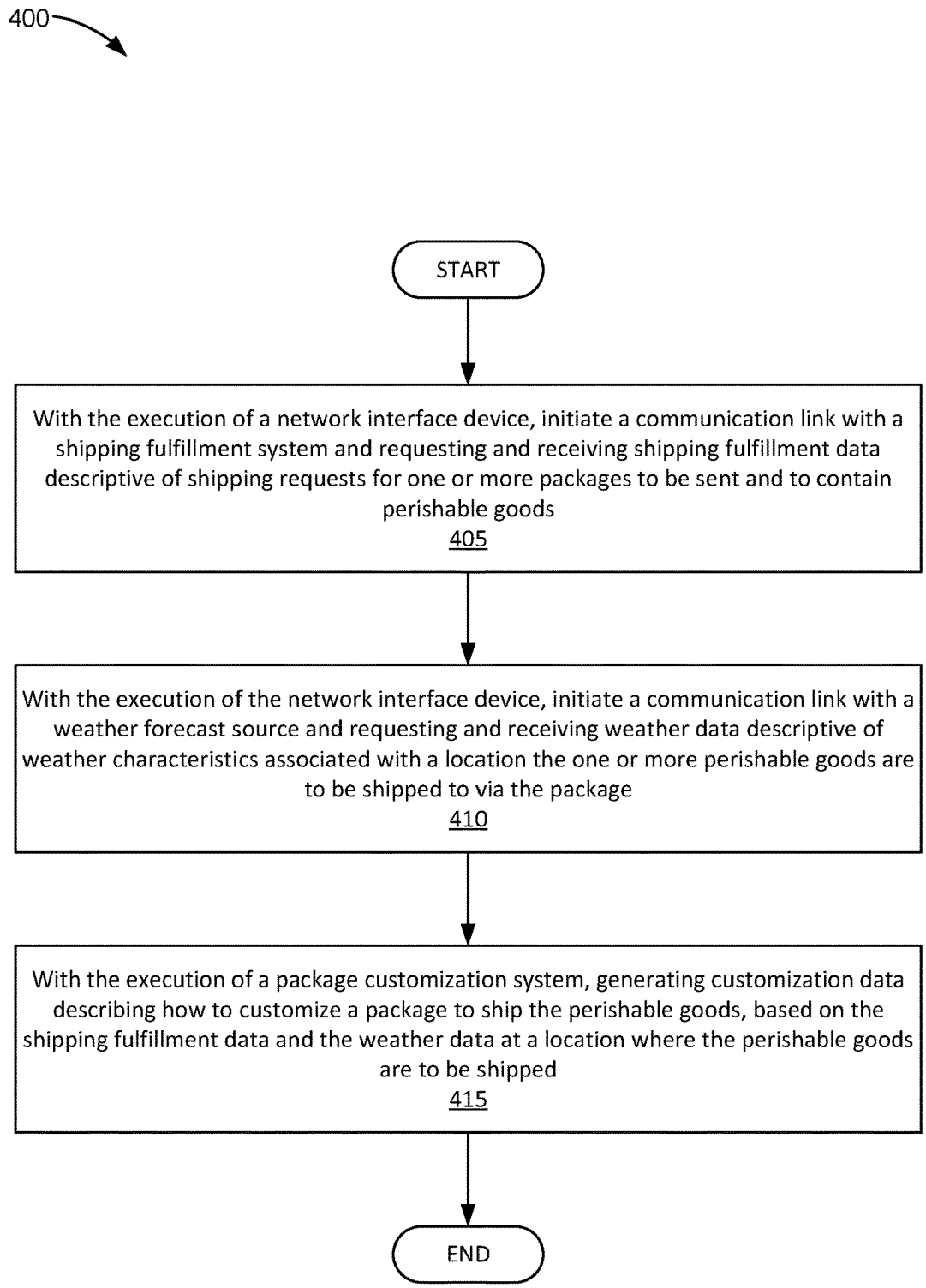
FIG. 4 is a flow diagram illustrating a method of shipping perishable goods according to an embodiment of the present disclosure.

FIG. 4 is a flow diagram illustrating a method 400 of shipping perishable goods according to an embodiment of the present disclosure. As described herein, the systems and methods allow a seller of perishable goods to reduce lost revenue as a result of damages to the perishable goods due to weather conditions at the point of delivery that would not otherwise have been considered at the time of building the packaging and shipping the packaging. By executing the processes described in connection with FIG. 4, each package containing perishable goods may be customized based on, at least, the location where the perishable good are to be shipped and temperatures at the locations where the perishable good is to be shipped.

The method 400 may being at block 405 with initiating a communication link with a shipping fulfillment system and requesting and receiving shipping fulfillment data descriptive of shipping requests for one or more packages to be sent and to contain perishable goods. The communication link may be initiated by execution of a NID at the information handling system. The shipping fulfillment data may describe a perishable good to be shipped, when the perishable good is to be shipped, the location where the perishable good is to be shipped, temperature ranges that the perishable good is to be shipped at, any stock keeping unit (SKU) number associated with the perishable good, physical dimensions of the perishable goods, and any temperature control device suggested by a producer of the perishable good to be used to ship with the perishable good, among other shipping fulfillment data such as a common carrier to use to ship the fresh meat. In these embodiments each set of shipping fulfillment data may be associate with a single shipping request from a seller of the perishable goods on behalf of the buyer.

In an example, the shipping fulfillment data may include information describing that fresh meat is to be shipped to Sacramento, California from Salt Lake City, Utah. In this example, a specific SKU number may be associated with the fresh meat that provides additional seller-identified shipping requests for the shipping package. For example, the additional seller-identified shipping requests may include the poundage of the fresh meat and the dimensions of the fresh meat to be shipped. Additionally, the SKU may indicate that the fresh meat should be maintained at a temperature of between 36 and 45 degrees Fahrenheit and may even suggest the type and number of temperature control devices to be included. In an embodiment, the additional seller-identified shipping requests may be overridden by the operator of the information handling system based on other data received such as the weather data described herein.

The method 400 may continue at block 410 with initiating a communication link with a weather forecast source and requesting and receiving weather data descriptive of weather characteristics associated with a location the one or more perishable goods are to be shipped to via the package. Again, this communication link may be initiated by execution of a NID at the information handling system. The weather data may be descriptive of weather characteristics associated with a location the one or more perishable goods are to be shipped and may include forecasted temperatures during the delivery period, cloud cover during the delivery period, temperatures along a route to be taken by the package to be shipped, among other weather data.

Furthering the example presented at block 405, at block 410, the weather data may include a forecast of 85 degrees Fahrenheit at Sacramento, California with an average of 75 degrees Fahrenheit along a predetermine route the shipped package is to take. Additionally, the weather data may indicate that on the date of deliver at the delivery location, no cloud cover is anticipated. As these high temperatures and no cloud cover being expected, the system may accommodate for an expected high heat by suggesting the inclusion of a certain amount of insulation to include in the package as well as any temperature control devices to include in the package (e.g., cold packs).

The method 400 may also include, at block 415, with generating customization data describing how to customize a package to ship the perishable goods based on the shipping fulfillment data and the weather data at a location where the perishable goods are to be shipped. The generation of the customization data may be done via execution of a package customization system as described herein. In an embodiment, the execution of the package customization system may, via the GUI, notify a user that shipping fulfillment data has been received from a shipping fulfillment system that describes a perishable good to be shipped, when the perishable good is to be shipped, the location where the perishable good is to be shipped, temperature ranges that the perishable good is to be shipped at, any stock keeping unit (SKU) number associated with the perishable good, and any temperature control device suggested by a producer of the perishable good to be used to ship with the perishable good, among other shipping fulfillment data. In an embodiment, the execution of the package customization system may, via the GUI, notify a user of the receipt of weather data from a weather forecast source associated with the location where the perishable good is to be shipped and/or the any weather data associated with a route that the package is to take to deliver the perishable good. The GUI may also display, during execution of the package customization system, any suggested customizations that are to be made to the package so that the perishable good may reach the determined destination based on the shipping fulfillment data and the weather data. In an embodiment, the user may implement the input devices (e.g., mouse, keyboard, etc.) to augment the suggested customizations that are to be made to the package so that the perishable good may reach the determined destination based on the shipping fulfillment data and the weather data.

Again. continuing with the examples presented at blocks 405 and 410, the package customization system may indicate the meat should be shipped in a package having an internal dimensional space available to fit the fresh meat therein (e.g., 1 foot wide, 1 foot wide, 1 foot long). Still further the package customization system may indicate that, due to the temperatures at the location of delivery (e.g., Sacramento) an inch of insulation should be included with 2 to 3 temperature control devices embedded in that insulation. Still further, the package customization system may also apply specific details related to the types of materials used to build the package such as the type of temperature control devices to use, the type of insulation to use, the type of tape or staples to use to close the package among other characteristics of the package described herein. This customization allows for a specific perishable item to be shipped in a customize package based on the shipping fulfillment data and weather data as described herein. This method 400 better customizes the package used to ship the perishable goods thereby increasing the ability of the seller to successfully ship a product that in a form to be consumed by the purchaser. This further reduces customer dissatisfaction and reduces lost revenue due to the perishable goods perishing prior to consumption by the user.

Figure 5:
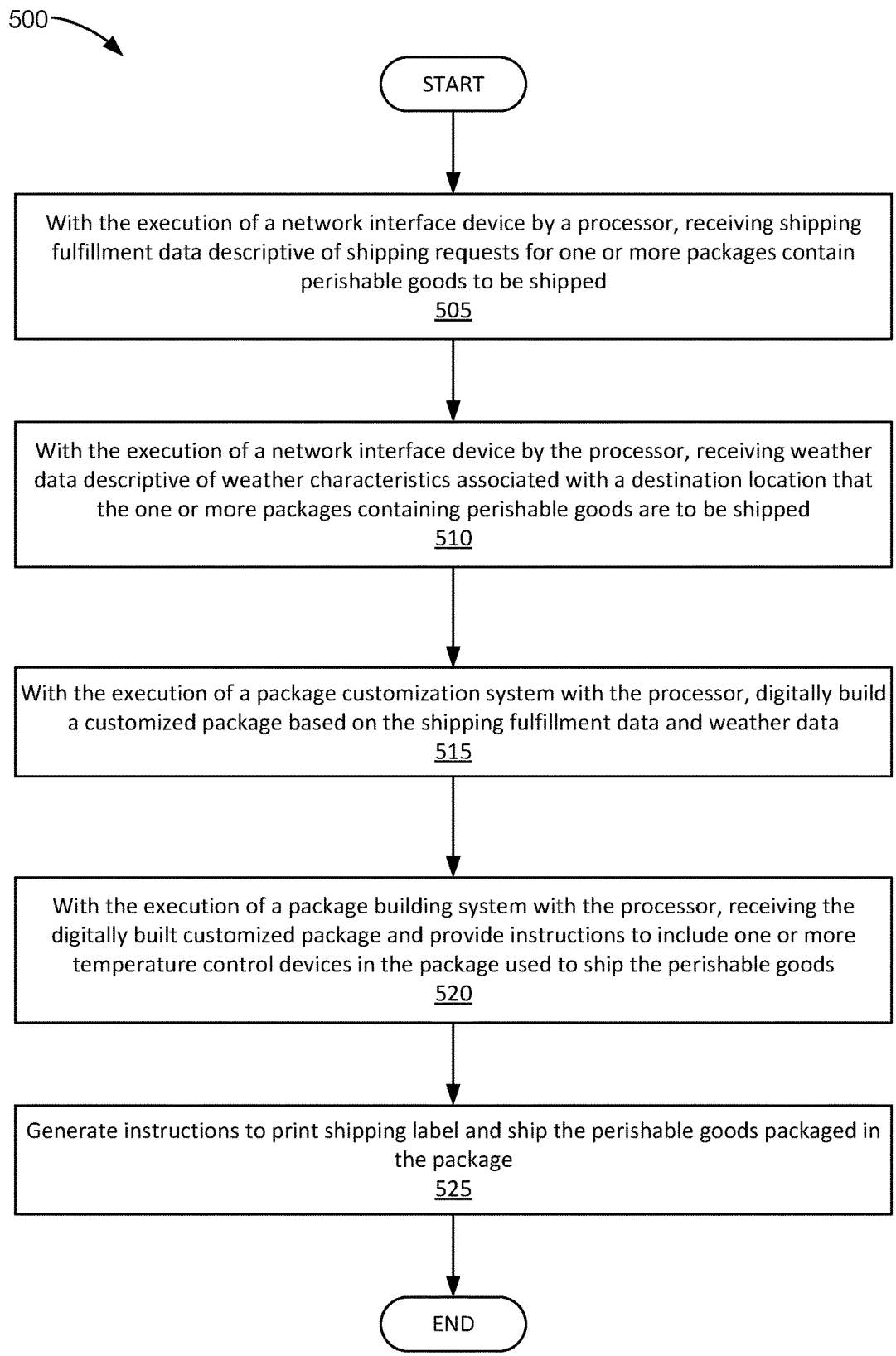
FIG. 5 is a flow diagram illustrating a method of shipping perishable goods according to an embodiment of the present disclosure.

FIG. 5 is a flow diagram illustrating a method 500 of shipping perishable goods according to an embodiment of the present disclosure. As described herein, the systems and methods allow a seller of perishable goods to reduce lost revenue as a result of damages to the perishable goods due to weather conditions at the point of delivery that would not otherwise have been considered at the time of building the packaging and shipping the packaging. By executing the processes described in connection with FIG. 5, each package containing perishable goods may be customized based on, at least, the location where the perishable good are to be shipped and temperatures at the locations where the perishable good is to be shipped. Other factors may be considered as well in order to further customize the package.

The method 500 may being at block 505 with receiving shipping fulfillment data descriptive of shipping requests for one or more packages contain perishable goods to be shipped via the execution of a NID by the processor of an information handling system. As described herein, the shipping fulfillment data may describe a perishable good to be shipped, when the perishable good is to be shipped, the location where the perishable good is to be shipped, temperature ranges that the perishable good is to be shipped at, any stock keeping unit (SKU) number associated with the perishable good, physical dimensions of the perishable goods, and any temperature control device suggested by a producer of the perishable good to be used to ship with the perishable good, among other shipping fulfillment data such as a common carrier to use to ship the fresh meat. In these embodiments each set of shipping fulfillment data may be associate with a single shipping request from a seller of the perishable goods on behalf of the buyer.

In an example, the shipping fulfillment data may include information describing that fresh fruit is to be shipped to Augusta, Maine from Jacksonville Florida. In this example, a specific SKU number may be associated with the fresh fruit that provides additional seller-identified shipping requests for the shipping package. For example, the additional seller-identified shipping requests may include the poundage of the fresh fruit and the dimensions of the fresh fruit to be shipped. Additionally, the SKU may indicate that the fresh fruit should be maintained at a temperature of between 46 and 55 degrees Fahrenheit and may even suggest the type and number of temperature control devices to be included. In an embodiment, the additional seller-identified shipping requests may be overridden by the operator of the information handling system based on other data received such as the weather data described herein.

The method 500 may include, at block 510, receiving weather data descriptive of weather characteristics associated with a destination location that the one or more packages containing perishable goods are to be shipped via the execution of a NID by the processor of an information handling system. In an embodiment, the weather data may be accessed at a weather forecast source such as a weather-related webpage that provide weather forecasts of specific locations. Example weather-related webpages include weather.com operated by The Weather Company®, weatherbug.com operated by GroundTruth®, accuweather.com operated by AccuWeather® Inc., among others. In an embodiment, a single weather-related webpage may be used as the weather forecast source to acquire the weather data. In an embodiment, more than one weather-related webpage may be used as the weather forecast source to acquire the weather data. Additionally, or alternatively, the weather forecast source may include government databases such as the national weather service at weather.gov. The weather data received includes data describing temperatures at the location of delivery of the package, cloud cover expected at the location of delivery, among other weather-related characteristics.

Furthering the example presented at block 505, at block 510, the weather data may include a forecast of 60 degrees Fahrenheit at Augusta Maine with an average of 65 degrees Fahrenheit along a predetermine route the shipped package is to take. Additionally, the weather data may indicate that on the date of deliver at the delivery location, extreme cloud cover is anticipated. As these low temperatures and significant cloud cover being expected, the system may accommodate for an expected low heat by suggesting the inclusion of a certain amount of insulation to include in the package as well as any temperature control devices to include in the package (e.g., heat packs).

At block 515, the method 500 includes digitally building a customized package based on the shipping fulfillment data and weather data. The digitally built customized package may be built via execution of the package building system as described herein. The package building system may be operatively coupled to the package customization system via a bus of the information handling system. The package building system may receive directions from the package customization system descriptive of how the package used to ship a specific perishable good in is to be built. In an embodiment, the package building system may receive from the package customization system data describing the amount of insulation (if any) to include in the package, the number (if any) temperature control devices to include in the package, and the dimensions of the package in order to fit the perishable goods, insulation (if any), and temperature control devices (if any). In an embodiment, the package building system may interface with the display device via the bus in order to, for example, display at a GUI package building specifications to a worker at the fulfillment location (e.g., a builder of the package) instructive as to how to build the package used to ship the perishable goods. This allows the worker to know, among other features, the dimensions of the package, the amount of insulation (if any) to include in the package, the number of (if any) temperature control devices to include in the package, and how to arrange the insulation and temperature control devices within the dimensions of the package. In this manner, the package building system may direct anyone as to how the package for any specific package fulfillment request from a seller is to be built.

In an alternative embodiment, the package building system may be operatively coupled to, for example, package assembly information handling system that executes a package assembly GUI directing automated package assembly machinery that automatically builds the package used to ship the perishable goods. The automated package assembly machinery may include any machinery that physically builds the package and may include conveyor belts, gluing devices, stapling devices, insulation insertion devices, temperature control device-insertion devices, taping devices, among others. In a specific embodiment, the automated package assembly machinery may include a mold into which any number of temperature control devices are inserted, closed, and expansion insulation is injected into the mold. In this embodiment, the mold may embed the selected number of temperature control devices into insulative walls that are then placed into a cardboard box thereby forming the package into which the perishable goods are placed. Although specific types of packages are described in the present specification, the description contemplates that other form factors of packages may be automatically built by the automated package assembly machinery.

Continuing with the examples described at blocks 505 and 510, the display device of the information handling system may present as output the digitally built package to a user on a GUI. This GUI, in an embodiment, may provide a builder of the package to visually see the amount of insultation to include within the package (if any), the number of temperature control devices to include in the package (if any), the type of temperature control devices to include in the package, and the dimensions of the package being built in order to fit the perishable good inside the package, among other details. In some examples, certain sellers of the perishable goods (e.g., the fresh fruit) may request specific additional details be incorporated into the building of the package such as specific types of packing tape to be used, specific types of cardboard to use, specific types of temperature control devices to use (e.g., heat packs), among other details. The package customization system 226 may identify these seller-specific details and cause the package building system to incorporate those details in the digital building process of the package.

At block 520, the method 500 includes receiving the digitally built customized package via execution of the package building system with the processor of the information handling system and providing instructions to include one or more temperature control devices in the package used to ship the perishable goods. In these examples, because of the anticipated cold conditions in Augusta, Maine the digitally built package may indicate that a certain number of heat packs be included in the package so that the fresh fruit does not freeze and spoil.

In an embodiment, the method 500 may include, at block 525, generating instructions to print a shipping label with the worker shipping the perishable goods packaged in the package to the buyer. In an embodiment, the shipping label may describe the shipping service to use such as FedEx®, UPS®, USPS®, DHL®, among others. The shipping label may include a barcode used to facilitate the transfer and delivery of the package to its final destination.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
   a processor;
   a memory;
   a power management unit;
   a network interface device, executed by the processor, to:
      initiate a communication link, over a network, with a shipping fulfillment system to request and receive shipping fulfillment data descriptive of shipping requests for one or more packages to contain perishable goods to be shipped; and
      initiate a communication link, over the network, with a weather forecast source to request and receive weather data descriptive of weather characteristics associated with a location the perishable goods are to be shipped; and
   a package customization system executable by the processor to, based on the shipping fulfillment data and the weather data at a location where the perishable goods are to be shipped to, provide customization data describing how a package used to ship the perishable goods is to be customized to prevent perishing of the perishable goods;
   wherein the customization data describing how to customize a package to ship the perishable goods further describes:
      whether to include one or more cold packs within a created insulative wall of the package by an automated package assembly machinery used to ship the perishable goods;
      whether to include one or more heat packs within a created insulative wall of the package by an automated package assembly machinery used to ship the perishable goods; and
      a thickness of insulative material to form insulative walls within the package;
   the package customization system operatively coupled to a package building system to direct the automated package assembly machinery to automatically build the package based on the customization data, the automated package assembly machinery comprising a mold into which the cold packs or hot packs are inserted, closed, and expansion insulation is injected into the mold to form the insulative walls with embedded cold packs or hot packs.

2. The information handling system of claim 1, wherein the weather data includes temperatures associated with the location where the perishable goods are to be shipped.

3. The information handling system of claim 1, wherein the weather data includes data associated with cloud cover forecasted at the location where the perishable goods are to be shipped.

4. The information handling system of claim 1, wherein the weather data includes data descriptive of temperatures along a route to be taken by the package to be shipped.

5. The information handling system of claim 1, wherein the shipping fulfillment data further includes data descriptive of a route the packages are to make during transit.

6. A method of shipping perishable goods, comprising:
   with an execution of a network interface device, initiate a communication link with a shipping fulfillment system and requesting and receiving shipping fulfillment data descriptive of shipping requests for one or more packages to be sent and to contain perishable goods;
   with the execution of the network interface device, initiate a communication link with a weather forecast source and requesting and receiving weather data descriptive of weather characteristics associated with a location the perishable goods are to be shipped to via a package; and with the execution of a package customization system, generating customization data describing how to customize a package to ship the perishable goods, based on the shipping fulfillment data and the weather data at a location where the perishable goods are to be shipped;

wherein the customization data describing how to customize a package to ship the perishable goods further describes to automated package assembly machinery how to include one or more cold packs in the package used to ship the perishable goods, wherein the automated package assembly machinery automatically builds the package by placing the cold packs into an automated mold, closing the mold, and injecting expansion insulation into the mold to form insulative walls within the package with the cold packs embedded within the insulative walls.

7. The method of claim 6, wherein the weather data includes temperatures associated with the location where the perishable goods are to be shipped.

8. The method of claim 6, wherein the weather data includes data associated with cloud cover forecasted at the location where the perishable goods are to be shipped.

9. The method of claim 6, the weather data descriptive of a route to be taken by the package to be shipped.

10. The method of claim 6, wherein the shipping fulfillment data further includes data descriptive of a route the packages are to make during transit.

11. A shipping management system, comprising:
a processor;
a memory;
a power management unit;
a network interface device, executable by the processor, to request and receive:
    shipping fulfillment data from a shipping fulfillment system descriptive of shipping requests for one or more packages contain perishable goods to be shipped;
    weather data from a weather forecast source descriptive of weather characteristics associated with a destination location that the one or more packages containing perishable goods are to be shipped;
a package customization system executable by the processor to digitally build a customized package based on the shipping fulfillment data and weather data to prevent perishing of the perishable goods during delivery;
a package building system to receive the digitally built customized package and provide instructions to include one or more cold packs in the package used to ship the perishable goods; and
automated package assembly machinery to receive customization data describing how to customize a package to ship the perishable goods and automatically build the package used to ship the perishable goods, wherein the automated package assembly machinery includes a mold and wherein the cold packs are automatically placed within the mold, the mold is closed, and expansion insulation is injected into the mold to form insulative walls within the package with the cold packs embedded within the insulative walls.

12. The shipping management system of claim 11, wherein the weather data includes temperatures associated with the location where the perishable goods are to be shipped.

13. The shipping management system of claim 11, wherein the weather data includes data associated with cloud cover forecasted at the location where the perishable goods are to be shipped.

14. The shipping management system of claim 11, the weather data descriptive of a route to be taken by the package to be shipped.

15. The shipping management system of claim 11, wherein the shipping fulfillment data further includes data descriptive of a route the packages are to make during transit.

* * * * *